(12) United States Patent
Böttger et al.

(10) Patent No.: US 7,992,693 B2
(45) Date of Patent: Aug. 9, 2011

(54) VIBRATION DAMPER WITH A MOUNTING

(75) Inventors: Christian Böttger, Frensdorf (DE);
Josef Renn, Dettelbach (DE); Jörg Pagel, Hoppachshof (DE); Klaus Stretz, Hassfurt (DE)

(73) Assignee: ZF Friedrichshafen AG, Friedrichshafen (DE)

(*) Notice: Subject to any disclaimer, the term of this patent is extended or adjusted under 35 U.S.C. 154(b) by 1040 days.

(21) Appl. No.: 11/888,998

(22) Filed: Aug. 3, 2007

(65) Prior Publication Data
US 2008/0029358 A1 Feb. 7, 2008

(30) Foreign Application Priority Data

Aug. 4, 2006 (DE) .................. 10 2006 036 506

(51) Int. Cl.
*F16F 9/00* (2006.01)

(52) U.S. Cl. ............. 188/322.19; 188/321.11; 248/74.1; 248/230.1; 248/314; 403/187; 403/230; 403/265; 403/353

(58) Field of Classification Search ............. 188/321.11, 188/322.19, 322.2; 248/74.1, 230.1, 314; 280/124.134, 124.135, 124.145, 124.147, 280/179, 220; 267/179, 220; 403/230, 233–235, 403/237, 187, 188, 190, 191, 265–267, 270, 403/271, 353
See application file for complete search history.

(56) References Cited

U.S. PATENT DOCUMENTS

| | | | | |
|---|---|---|---|---|
| 2,392,932 A | * | 1/1946 | Macbeth | ........................ 403/73 |
| 4,194,760 A | * | 3/1980 | Shiomi et al. | ............ 280/86.753 |
| 4,491,339 A | * | 1/1985 | Mizumukai et al. | ... 280/124.154 |
| 4,531,618 A | * | 7/1985 | Kobiske et al. | .......... 188/321.11 |
| 4,619,465 A | * | 10/1986 | Johnson | .................... 280/86.753 |
| 4,784,406 A | | 11/1988 | Stinson | |
| 4,878,642 A | * | 11/1989 | Kirby, Jr. | .................... 248/311.2 |
| 5,145,204 A | * | 9/1992 | Perkins | .................. 280/124.144 |
| 5,308,032 A | * | 5/1994 | Ohta | ........................... 248/230.2 |
| 5,326,084 A | | 7/1994 | Mevissen et al. | |
| 5,669,728 A | * | 9/1997 | Koba | ............................. 403/270 |
| 5,730,547 A | * | 3/1998 | Nogami | ........................ 403/384 |
| 5,797,618 A | | 8/1998 | Brokhole | |
| 6,269,920 B1 | | 8/2001 | Handke | |
| 6,692,012 B2 | * | 2/2004 | Fullenkamp et al. | .. 280/124.154 |

FOREIGN PATENT DOCUMENTS

DE 82 27 474 1/1983

(Continued)

OTHER PUBLICATIONS

German Office Action issued in a corresponding application.

*Primary Examiner* — Robert Siconolfi
*Assistant Examiner* — Mariano Sy
(74) *Attorney, Agent, or Firm* — Cohen Pontani Lieberman & Pavane LLP

(57) ABSTRACT

Presented is a vibration damper that includes an outer cylinder with a lateral surface, a pin-shaped fastening element that includes a stop surface, and a mounting coupled to the lateral surface. The mounting defines a through-hole that is configured to receive the pin-shaped fastening element and extends circumferentially with respect to the lateral surface. The mounting includes a formation that extends in a radial direction with respect to the cylinder. The formation cooperates with the outer cylinder to form a socket for the stop surface. The stop surface rests against the mounting in an axial direction of the pin-shaped fastening element.

8 Claims, 8 Drawing Sheets

FOREIGN PATENT DOCUMENTS

| | | |
|---|---|---|
| DE | 42 01 837 | 2/1993 |
| DE | 198 33 008 | 11/1999 |
| DE | 296 24 300 | 1/2002 |
| DE | 10 2004 054 701 | 5/2006 |
| DE | 10 2004 054 710 | 5/2006 |
| EP | 0 720 924 | 7/1996 |
| EP | 1 101 636 | 5/2001 |
| GB | 1 579 930 | 11/1980 |
| GB | 2 127 936 | 4/1984 |
| JP | 11315877 A | 11/1999 |

\* cited by examiner

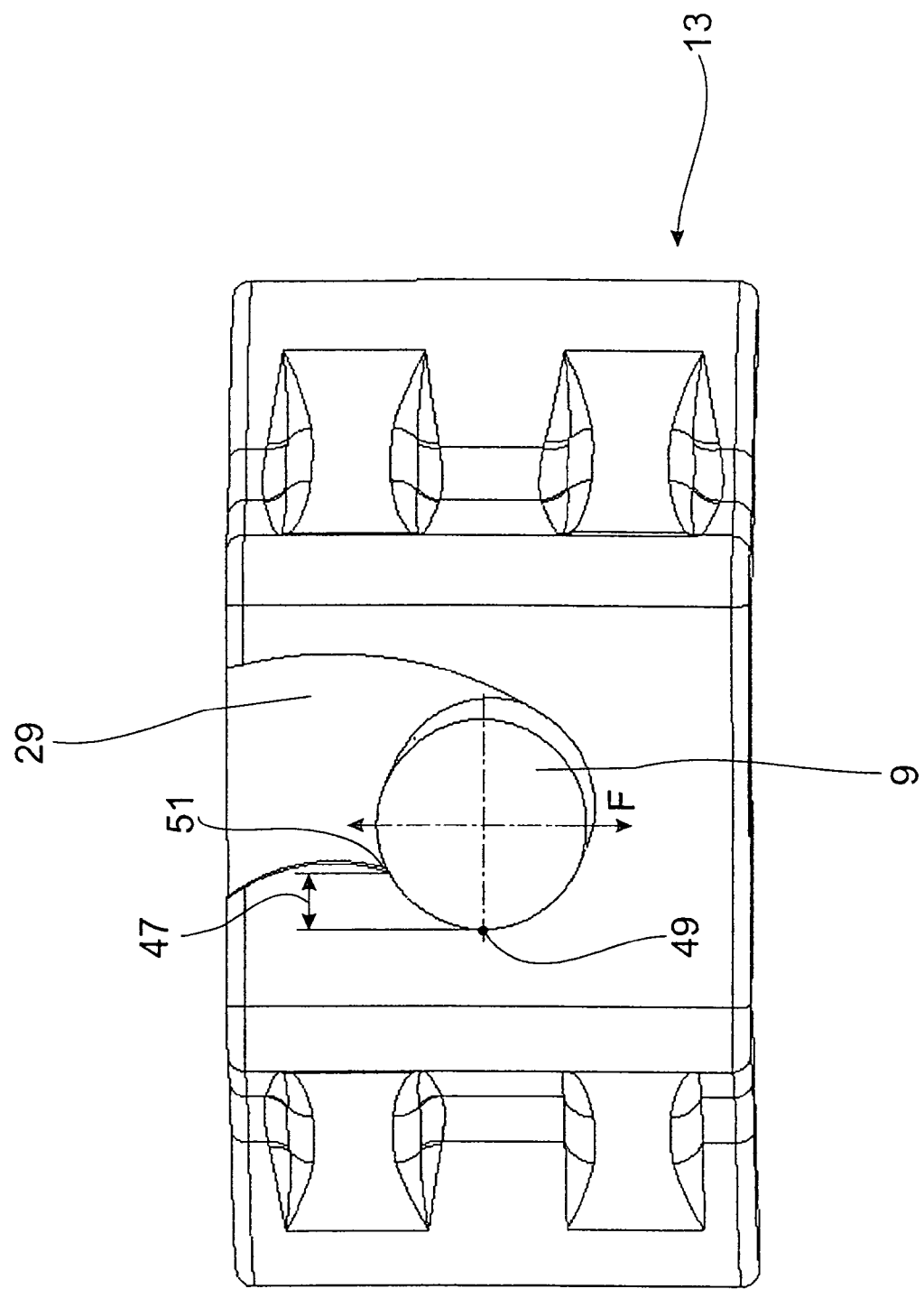

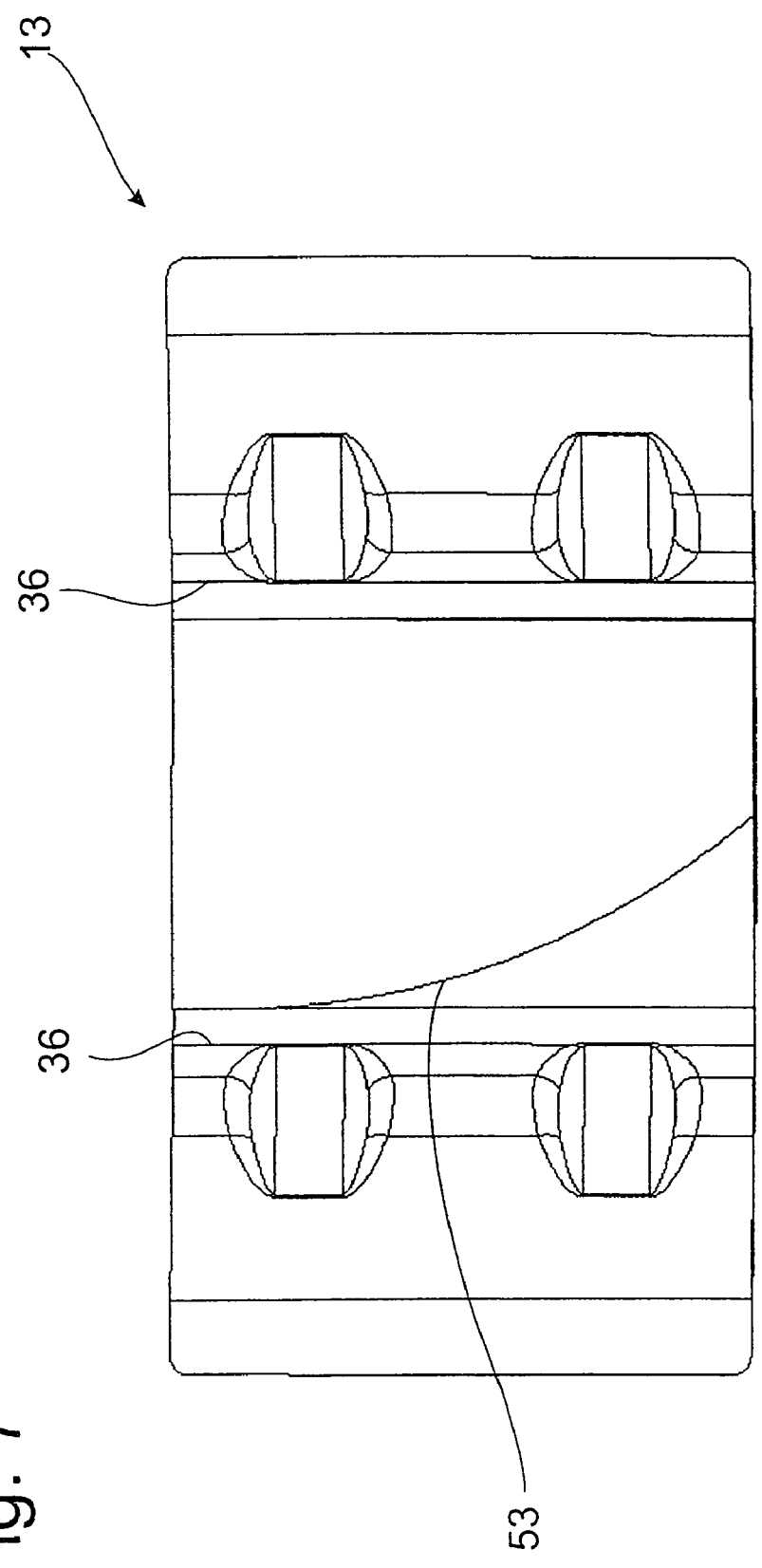

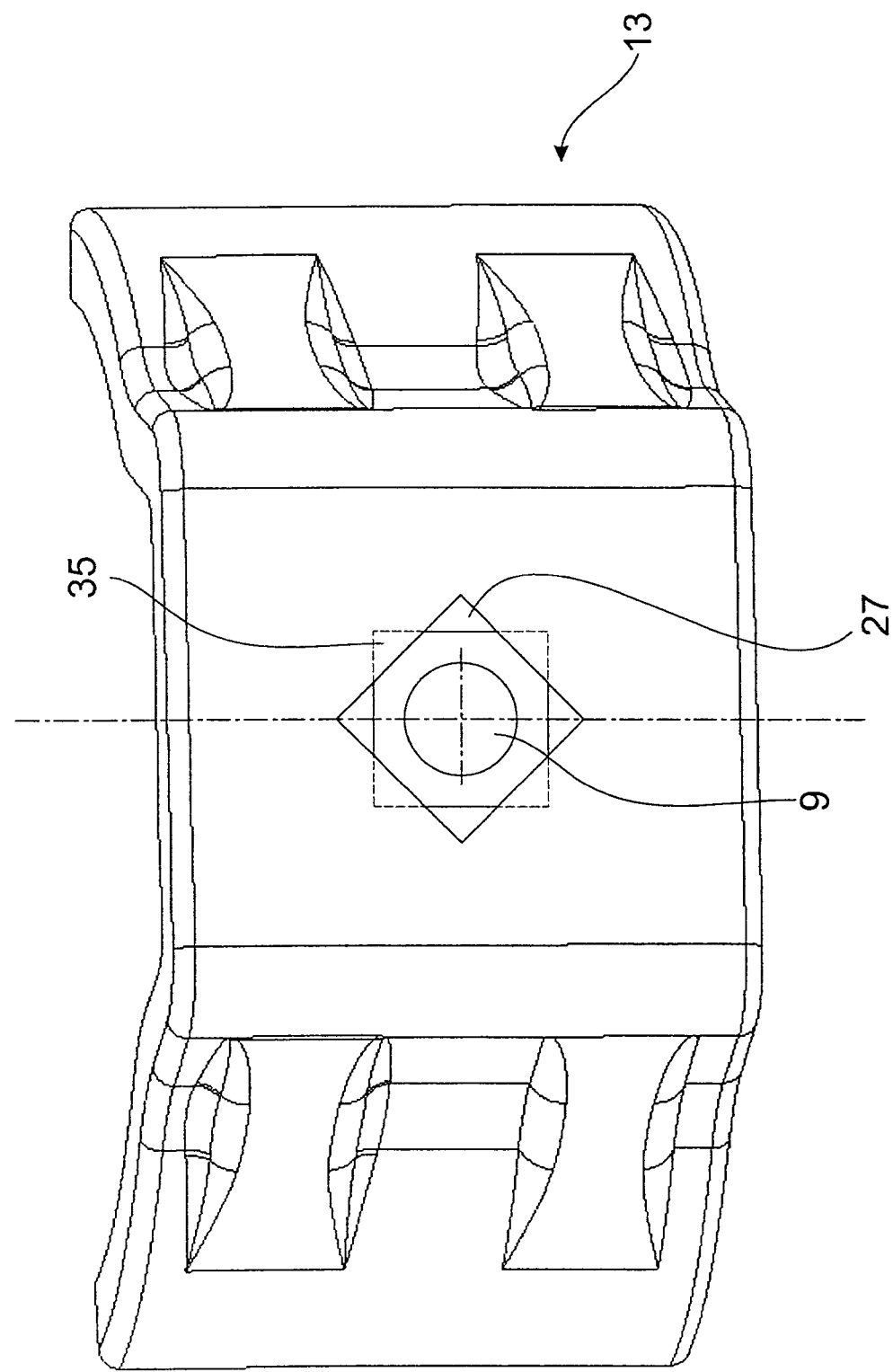

VIBRATION DAMPER WITH A MOUNTING

BACKGROUND OF THE INVENTION

1. Field of the Invention

The invention relates to a vibration damper with a mounting.

2. Description of the Related Art

A vibration damper with a disk spring, in which a fastening opening for a stabilizer is described in German patent DE 42 01 837 C1. The disk spring has a grid-like structure. Although this promises a certain advantage with respect to weight, it suffers from a considerable disadvantage with respect to cost. In addition, a comparatively large radial gap is present between the fastening opening and the connection of the disk spring to the vibration damper. As a result, the stabilizer introduces a strong bending moment into the vibration damper.

German patent DE 10 2004 054 701 A1 describes a vibration damper with a stabilizer mounting, which is formed, for example, by a welded-on threaded sleeve. The advantage of this design in comparison to DE 42 01 837 C1 is essentially that the lever arm between the stabilizer and the connecting point on the vibration damper is much shorter.

German patent DE 198 33 008 C1 pertains to a tension force limiting mounting, which is welded to the outer cylinder of a vibration damper. The tension force limiting mounting has lateral extensions, in which through-openings are provided for the fastening of a stabilizer. So that similar parts can be provided for installation on both the left and the right side of the vibration damper, the tension force limiting mounting has two lateral extensions. This leads to a disadvantage with respect to material and the amount of space required.

SUMMARY OF THE INVENTION

An object of the present invention is to provide a mounting for a stabilizer on a vibration damper, where the mounting has the shortest possible lever arm between the stabilizer and the vibration damper and which can be produced at low cost.

This object is accomplished according to the invention in that the mounting extends circumferentially with respect to a lateral surface of the cylinder and has a formation, which extends radially with respect to the cylinder. This formation cooperates with the cylinder to form a socket for a stop surface of the fastening means. The stop surface rests against the mounting in the axial direction of the fastening means.

The advantage of the invention is that the fastening means can have a very short lever arm. The socket extends only over the wall thickness of the stop surface, possibly with an allowance for the installing movement. The stop surface can be part of the head of a screw, for example. It is advantageous that no special design measures must be taken in regard to the cylinder of the vibration damper.

In a first embodiment, the through-hole extends in the form of a slot all the way to a lateral edge of the mounting, and the fastening means can be pushed into the through-opening from this lateral edge. Only a very small amount of space is required for installation.

It is provided that the fastening means is prevented from moving and coming loose in the direction in which the slot extends by a locking device.

It should also be possible to install the locking element itself without special tools. For this purpose, the locking device has a through-opening for the fastening means and is fastened to the mounting in such a way that the removal movement leading out of the slot of the mounting is blocked by the wall of the through-opening of the locking device.

The locking device consists of a plate-like element, which engages with the mounting. The plate-like element has at least one stop edge, which, during a movement in the removal direction of the fastening means, comes to rest against the mounting. The plate-like element simply rests on the radial formation of the mounting.

The fastening means preferably has a threaded pin. So that the threaded pin does not have to be held by a tool when a nut is screwed onto it, the fastening means has an anti-twist profile, which engages in a guide in the mounting.

In an alternative variant, the slot has a curved contour relative to the direction in which loads can be exerted on the fastening means. As a result, when a load is being exerted on the fastening means, it is possible for the wall of the slot to absorb a removal force acting parallel to the lateral surface of the cylinder. The fastening means is thus held securely in position.

It is also possible for the through-opening to have a non-circular profile and for the stop surface to have a boundary contour, which can be introduced through the through-opening into the socket. This contour can then be laid against the mounting by means of a turning movement around the longitudinal axis of the fastening means.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, like reference characters refer to the same parts throughout the different views. Also, the drawings are not necessarily to scale, emphasis instead generally being placed upon illustrating the principles of the invention.

FIG. 6 is a front view of the mounting with the curved slot of FIG. 5;

FIG. 7 is a rear view of the mounting with the curved slot of FIG. 5;

FIG. 8 is a perspective view of another embodiment of a mounting with a fastening means locked in place.

DETAILED DESCRIPTION OF THE PRESENTLY PREFERRED EMBODIMENTS

Figure 1:
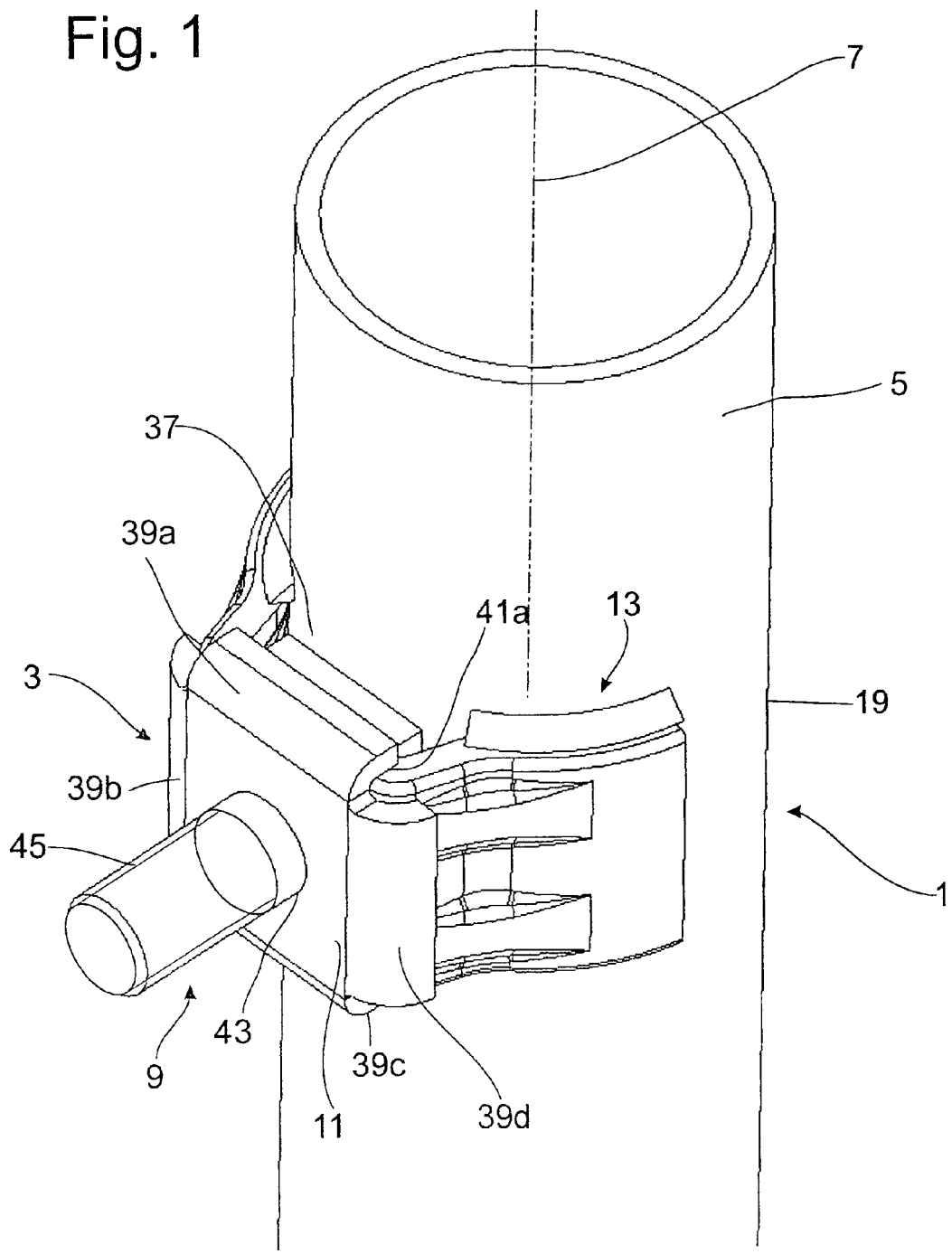
FIG. 1 is a perspective view of part of a vibration damper with a mounting.

FIG. 1 shows part of a vibration damper 1 of any desired type such as, for example, a shock or strut. FIG. 1 shows only a mounting 3 and an outer cylinder 5 of the vibration damper 1. In a motor vehicle, the mounting 3 serves preferably to hold a stabilizer, the purpose of which is to introduce the forces in a direction essentially parallel to the longitudinal axis of the cylinder 5.

Figure 2:
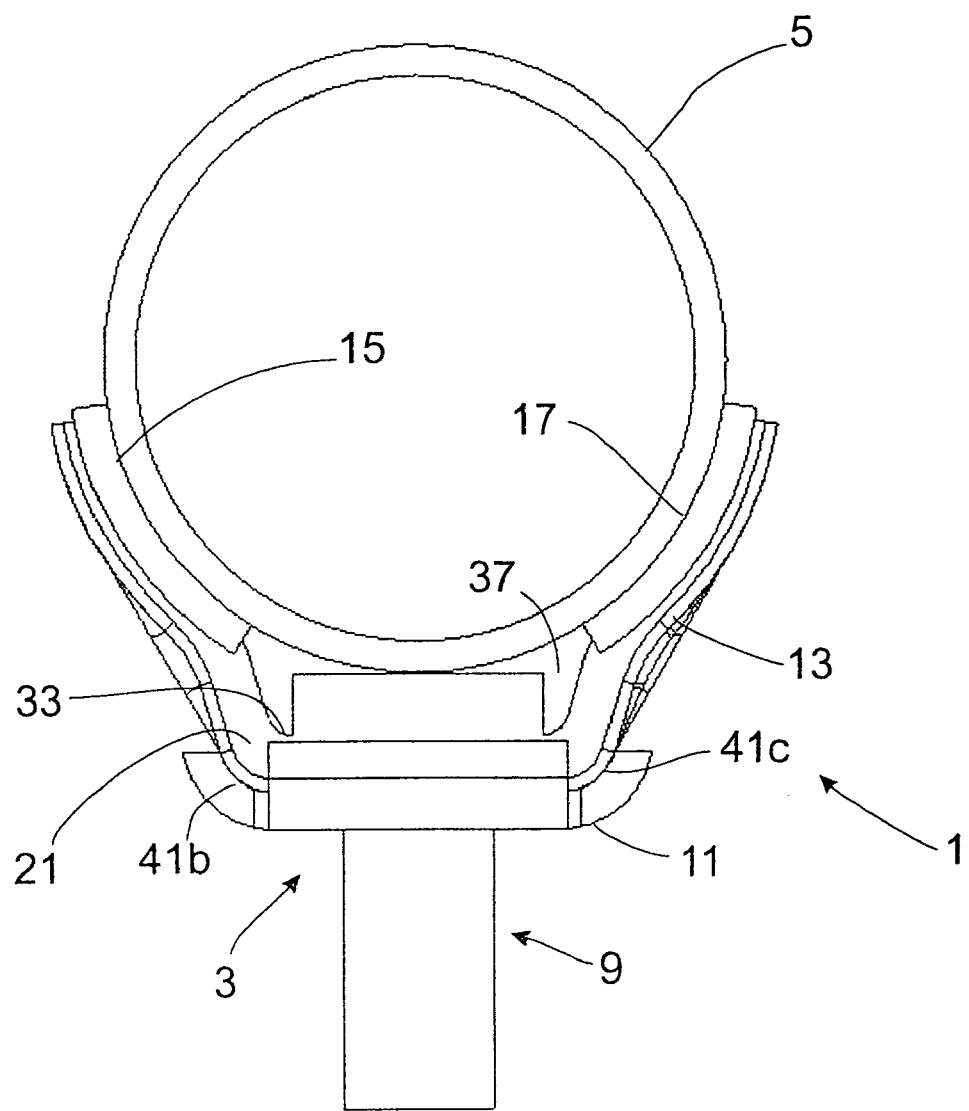
FIG. 2 is a top view of part of the vibration damper with a mounting of FIG. 1.
Figure 3:
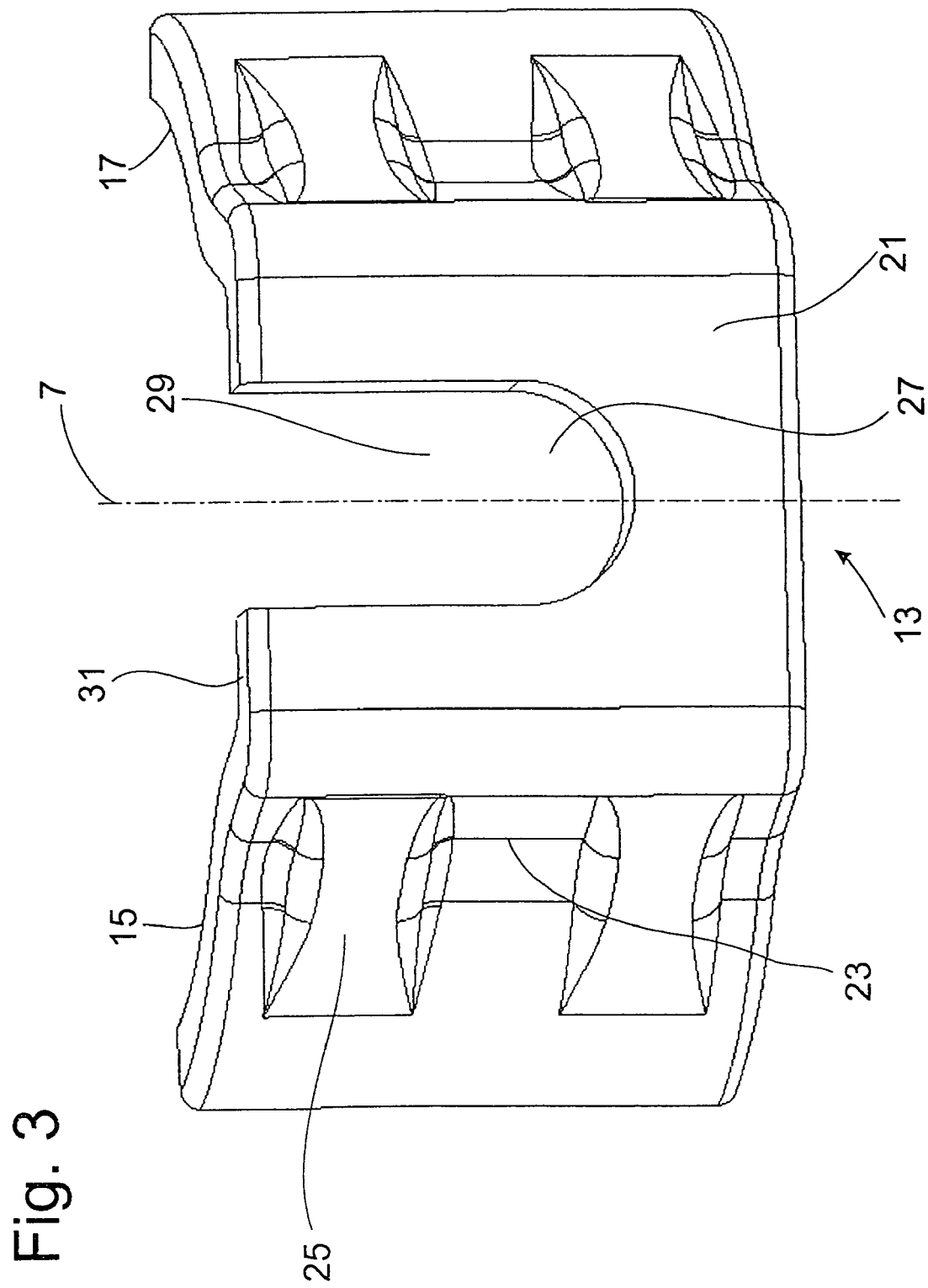
FIG. 3 is a perspective view of the mounting of FIG. 1 in isolation.
Figure 4:
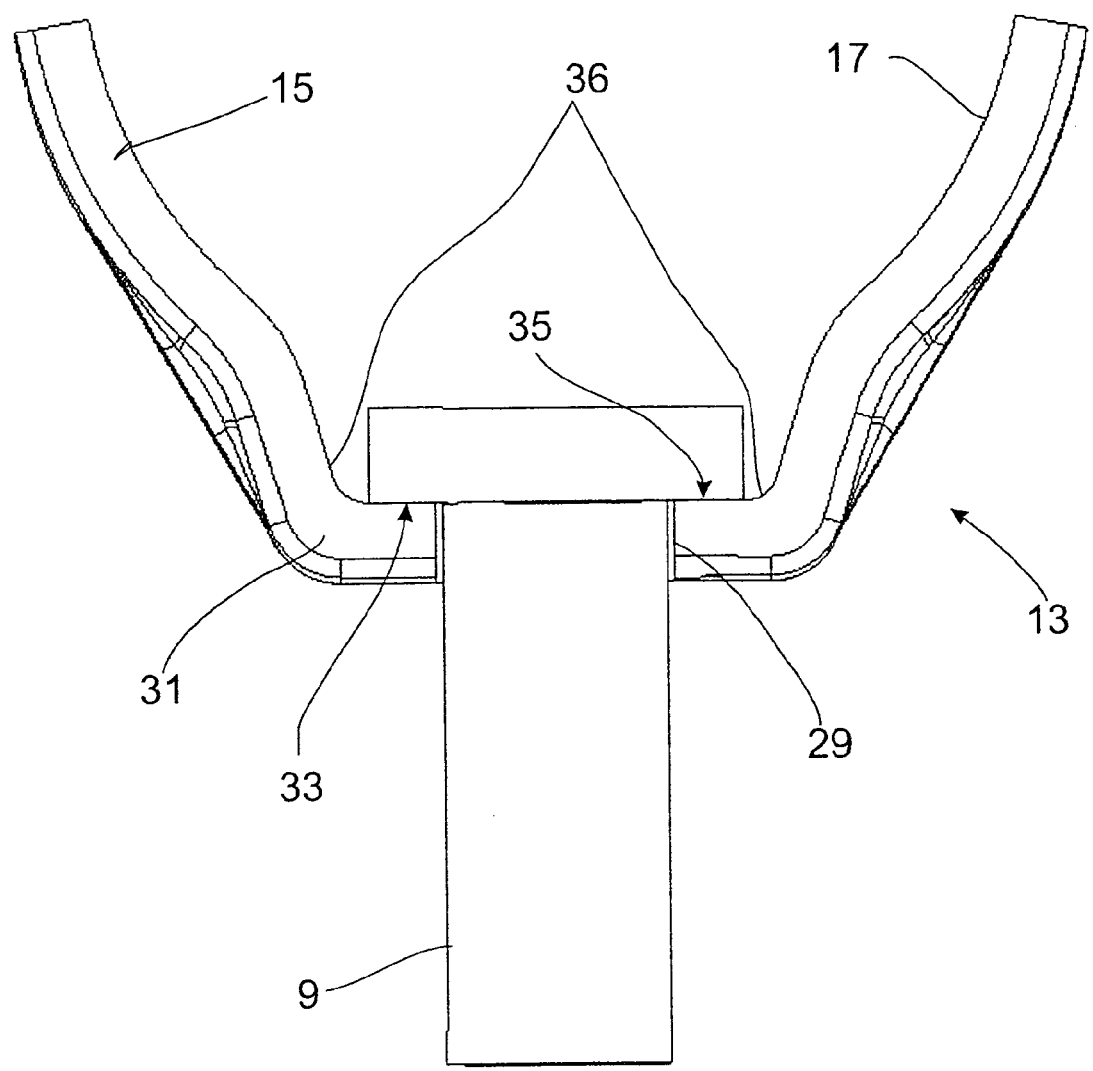
FIG. 4 is a top view of the mounting of FIG. 3 with a fastening means.

FIGS. 1 and 2 together shows that the mounting 3 comprises a pin-like fastening means 9 and a locking element 11. FIG. 3 shows a connecting plate 13 as the basis of the mounting 3. The connecting plate 13 is symmetric to the longitudinal axis 7 and has two surfaces 15, 17 which are in contact with the cylinder 5. The contour of the contact surfaces 15, 17 are adapted to the outer lateral surface 19 of the cylinder 5. Relative to the lateral surface 19 of the cylinder 5, the connecting plate 13 has a radial formation 21, possibly stiffened by reinforcing fins 25 in the transition area 23 to the contact surfaces. A through-hole 27 for the fastening means 9 is provided in this radial formation 21, where the through-hole 27 merges with a slot 29 extending all the way to a lateral edge 31 of the connecting plate 13. In the direction facing the outer lateral surface 19, the formation 21 has a contact surface 33 for the pin-like fastening means 9. The fastening means can be introduced into the slot 29 from the lateral edge 31 in a plane parallel to the outer lateral surface of the cylinder 5 (FIG. 4).

During the fabrication of the vibration damper 1, the edges of the contact surfaces 15, 17 of the connecting plate 13 are welded to the outer lateral surface 19 of the cylinder. Then a protective coating is applied to the surface of the cylinder 5. Next, the stop surface 35 of the pin-like fastening means 9 is pushed into the socket 37 formed by the cylinder 5 and the radial formation 21 of the connecting plate 13 (FIGS. 1 and 2). The stop surface 35 of the fastening means 9 thus comes to rest against the contact surface 33 of the connecting plate 13. As can be seen in FIG. 4, the stop surface 35 has a rectangular profile, which engages in a set of parallel guides 36 located at the transitions between the radial formation 21 and the contact surfaces 15, 17. This engagement thus prevents the pin from twisting.

So that the pin-like fastening means 9 cannot be pushed out of the slot 29 by the introduction of forces, means are provided to prevent pin-like fastening means 9 from coming loose. For this purpose, the plate-like locking element 11 is used, which, in this embodiment, has four angled tabs 39a-39d with stop edges 41a-41c, which establish a positive connection with the radial formation 21 (see FIGS. 1-2). A circular through-opening 43 is provided in the locking element 11. The walls of this opening 43 prevent the pin-like fastening means 9 from being moved up and out of the slot 29. The plate-like locking element 11 is simply threaded onto the pin-like fastening means 9 and then rests on the radial formation 21 of the connecting plate 13. When a fastening bearing of the stabilizer (not shown) is then screwed onto a fastening thread 45 of the fastening means, the locking element 11 itself is fixed permanently in the position shown.

Figure 5:
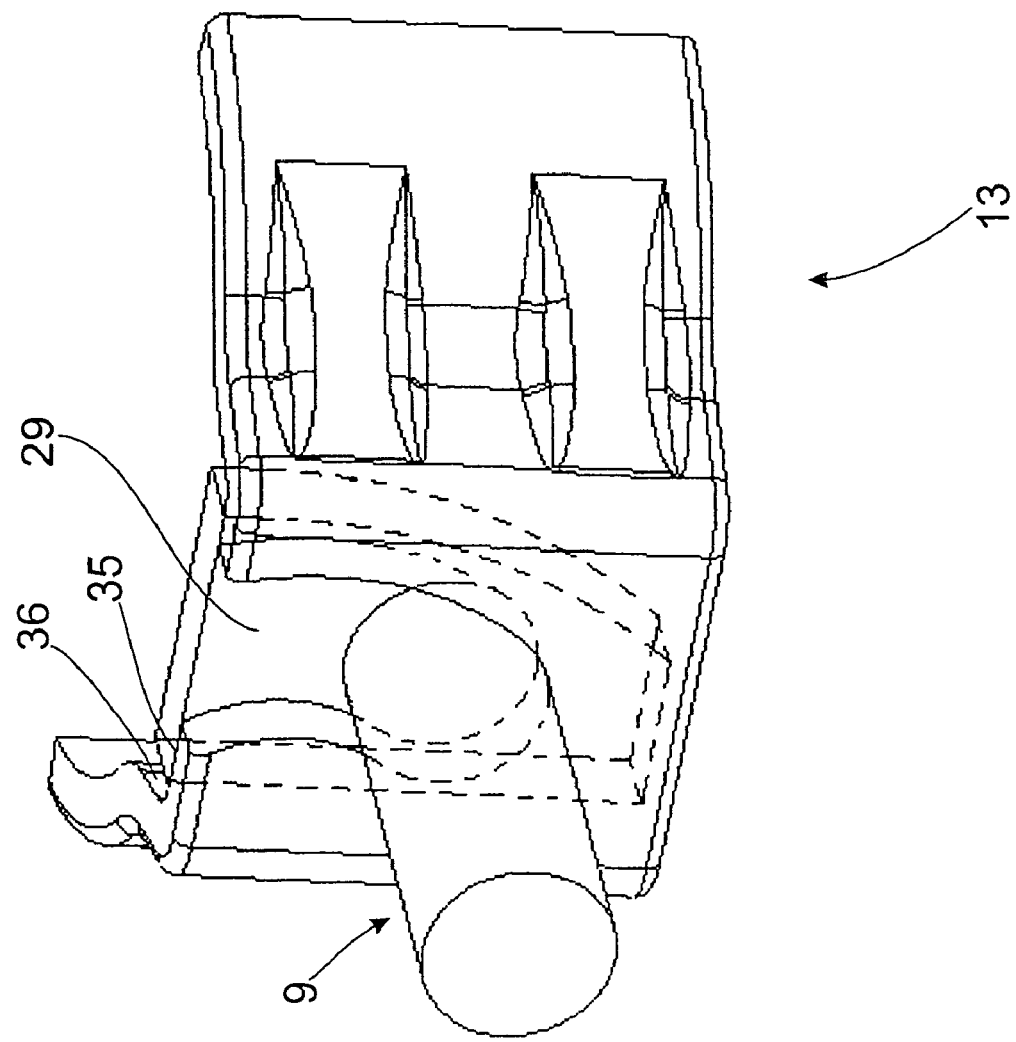
FIG. 5 is a perspective view of a mounting according to another embodiment with a curved slot.

In the embodiment according to FIGS. 5-7, a connecting plate 13 with a slot 29 is used. The slot has a curved shape with respect to the directions, illustrated by the action line F (FIG. 6), in which load can be exerted on the fastening means. A wall part 47, determined by the radial offset transversely to the action line F between a contact point 49 in the area of the greatest dimension and a contact point 51 in the area of the smallest dimension of the slot, serves as a locking surface, which prevents the unwanted removal movement. So that the stop surface 35 of the fastening means will not be able to twist under load, an anti-twist profile is again used. So that the fastening means can be removed properly when necessary, its lateral surface 53, i.e., the surface facing away from the guide 36, allows it to be maneuvered along the course of the slot 29. A separate locking element like that shown in FIG. 1 and FIG. 2 is not needed.

FIG. 8 shows another solution for a mounting 3, which requires no locking element 11. The through-hole 27 in the connecting plate 13 is provided with a noncircular profile. The stop surface of the fastening means can be pushed through the through-hole 27 into the socket 37 provided between the connecting plate 13 and the cylinder 5, and in this position it can be locked in place by means of a turning movement around the longitudinal axis of the fastening means 9. The stop surface 35 thus comes to rest against the contact surface of the connecting plate 13. In this locked position, the fastening means can no longer be pulled back out in its longitudinal direction through the through-hole 27.

Variations, modifications, and other implementations of what is described herein may occur to those of ordinary skill in the art without departing from the spirit and scope of the invention. Accordingly, the invention is not to be defined only by the preceding illustrative description.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper, comprising:
    an outer cylinder comprising a lateral surface;
    a pin-shaped fastening means comprising a stop surface; and
    a mounting coupled to the lateral surface and defining a through-hole configured to receive the pin-shaped fastening means and extending circumferentially with respect to the lateral surface, the mounting comprising a formation extending in a radial direction with respect to the cylinder, the formation cooperating with the outer cylinder to define a socket for the stop surface, the stop surface resting against the mounting in an axial direction of the pin-shaped fastening means,
    wherein the through-hole is a slot extending to a lateral edge of the mounting, and wherein the pin-shaped fastening means is insertable into the through-hole from the lateral edge.

2. The vibration damper according to claim 1, further comprising a locking device preventing the pin-shaped fastening means from moving in the direction that the slot extends.

3. The vibration damper according to claim 2, wherein the locking device defines a through-opening configured to receive the pin-shaped fastening means, and wherein the locking device is fastened to the mounting to prevent the pin-shaped fastening means from being removed from the slot.

4. The vibration damper according to claim 3, wherein the locking device comprises a plate element that engages the mounting.

5. The vibration damper according to claim 4, wherein the plate element comprises at least one stop edge that rests against the mounting when the pin-shaped fastening means is moved in a direction for removing the pin-shaped fastening means from the through-hole.

6. The vibration damper according to claim 5, wherein the plate element rests on the formation.

7. The vibration damper according to claim 1, wherein the mounting further comprises a guide and wherein the pin-shaped fastening means has an anti-twist profile that engages the guide.

8. The vibration damper according to claim 1, wherein the slot comprises a curved contour relative to a direction in which a load can be exerted on the pin-shaped fastening means.

* * * * *